United States Patent [19]

Egawa et al.

[11] Patent Number: 5,412,685
[45] Date of Patent: May 2, 1995

[54] LASER OSCILLATOR

[75] Inventors: Akira Egawa; Michinori Maeda; Yoshitaka Kubo, all of Yamanashi, Japan

[73] Assignee: Fanuc Ltd., Yamanashi, Japan

[21] Appl. No.: 244,915

[22] PCT Filed: Oct. 14, 1993

[86] PCT No.: PCT/JP93/01494
§ 371 Date: Jun. 15, 1994
§ 102(e) Date: Jun. 15, 1994

[87] PCT Pub. No.: WO94/10727
PCT Pub. Date: May 11, 1994

[30] Foreign Application Priority Data

Oct. 26, 1992 [JP] Japan .................. 4-287646

[51] Int. Cl.⁶ .......................... H01S 3/081
[52] U.S. Cl. ...................... 372/93; 372/99; 372/108; 372/107
[58] Field of Search ........... 372/92, 93, 107, 99, 372/108

[56] References Cited

U.S. PATENT DOCUMENTS

| | | | |
|---|---|---|---|
| 4,977,574 | 12/1990 | Karube | 372/93 |
| 5,023,886 | 6/1991 | Hobart et al. | 372/93 |
| 5,052,017 | 9/1991 | Hobart et al. | 372/93 |
| 5,208,825 | 5/1993 | Ishihara | 372/107 |
| 5,307,367 | 4/1994 | Karube | 372/108 |

FOREIGN PATENT DOCUMENTS

| | | | |
|---|---|---|---|
| 0187386 | 8/1986 | European Pat. Off. | 372/93 |
| 358769 | 3/1990 | European Pat. Off. | |
| 371781 | 6/1990 | European Pat. Off. | |
| 485619 | 5/1992 | European Pat. Off. | |
| 9320603 | 10/1993 | WIPO | 372/93 |

Primary Examiner—Léon Scott, Jr.
Attorney, Agent, or Firm—Staas & Halsey

[57] ABSTRACT

A laser oscillator which is capable of providing a circularly polarized laser beam by an external optical system having a brief configuration. A folding section of a folded-type resonator (10) comprises reflecting mirrors (4a), (4b) and (4c). The reflecting mirror (4a) is inclined at an angle of 45° to an optical axis of an excitation section (3a), and the reflecting mirror (4c) is inclined at an angle of 45° to an optical axis of an excitation section (3b). The reflecting mirror (4b) is horizontally arranged so that the center of the mirror is positioned at the vertex of an isosceles right triangle with respect to the reflecting mirrors (4a) and (4c). Thus, an S polarized-light component of a laser beam from the excitation section (3b) is reflected by the reflecting mirror (4c) toward the reflecting mirror (4b). Further, a P polarized-light component of the laser beam is reflected by the reflecting mirror (4b) to the reflecting mirror (4a), and the S polarized-light component is reflected by the reflecting mirror (4a), thus a laser beam having a linearly polarized-light component as shown by an arrow (11) is outputted from the folded-type resonator (10). Accordingly, only a ¼ wave-length mirror is used on the outside of the folded-type resonator (10); nevertheless a circularly polarized laser beam can be provided simply.

2 Claims, 6 Drawing Sheets

LASER OSCILLATOR

TECHNICAL FIELD

The present invention relates to a laser oscillator in which a laser beam is emitted from a folded-type resonator, and in particular, to a laser oscillator which is capable of simply providing a circularly polarized laser beam.

BACKGROUND ART

A gas laser oscillator such as a carbon dioxide gas laser oscillator can provide high efficiency and high output power, so that it has widely been employed in a laser beam machining field.

In the case of the aforesaid carbon dioxide gas laser oscillator, a $CO_2$ molecule which is used as a laser medium is excited by a discharge generated in the resonator. However, an electric power supplied for the discharge is subject to limitation due to a durability of members constituting an excitation section and a rise of gas temperature caused by an excitation. Further, the aforesaid laser needs to enlarge an output beam diameter due to limitation of light-proof strength of an output mirror. For this reason, it is necessary to make an optical path of the resonator long in order to obtain high output power; as a consequence, the laser system becomes too large as a whole. Thus, in order to avoid enlarging the configuration of the system, most of the laser oscillators are constituted such that the optical path of the resonator is multitudinously folded back so that an entire length of the laser oscillator becomes short.

FIG. 5 is a view schematically showing a configuration of a conventional folded-type resonator. In the figure, a resonator 20 comprises an output mirror 1, a rear mirror 2, excitation sections 3a and 3b, and reflecting mirrors 14a and 14b. All optical axes in the resonator 20 are adjusted so as to be in the identical horizontal plane. In the resonator 20 having such optical axes, the laser beam emitted from the output mirror 1 is polarized, in the vertical direction at an angle of 90° to the horizontal plane, as shown by an arrow 21.

When a laser beam is used for cutting metals or the like, it is desirable that a circularly polarized laser beam be irradiated to a workpiece in order to obtain high machining performance rather than a linearly polarized laser beam. For this reason, a linearly polarized laser beam in the vertical or horizontal direction is generally transformed to a circularly polarized laser beam by means of a mechanism as shown in FIG. 6.

FIG. 6 is a view showing a conventional optical system for transforming a linearly polarized laser beam to a circularly polarized laser beam. A laser beam emitted from the resonator 20 is polarized linearly in the vertical direction as shown by an arrow 21. In order to transform the aforesaid laser beam into a circularly polarized laser beam, a polarization mirror 5 for polarizing the laser beam linearly at an angle of 45° and a ¼ wave-length mirror 6 are required. The laser beam, which is transformed into a circularly polarized laser beam by the polarization mirror 5 and ¼ wave-length mirror 6, is further directed in the vertical direction by a mirror 7, and is converged by a condenser lens 8, thus being irradiated to a workpiece 9. The above explanation refers to a case of transforming a linearly polarized laser beam in the vertical direction into a circularly polarized laser beam. Likewise, a linearly polarized laser beam in the horizontal direction is transformed into a circularly polarized laser beam by the same optical system as described above.

As seen from FIG. 6, the conventional laser oscillator requires at least the polarization mirror 5 and ¼ wave-length mirror 6 in order to transform a linearly polarized laser beam in the vertical or horizontal direction into a circularly polarized laser beam. In addition, the conventional laser oscillator requires the mirror 7 for changing the direction of a laser beam into the vertically downward direction because a workpiece is usually placed on the horizontal plane. In other words, three external mirrors are required. For these additional mirrors, the cost of the laser oscillator, as a whole, becomes high.

These external mirrors are frequently contaminated with dust and the like, in contrast to mirrors included in the resonator. For this reason, the maintenance operations such as disassembling and cleansing are required. In addition, when assembling them after cleaning, it is necessary to make a complicated adjustment of the external optical system.

DISCLOSURE OF THE INVENTION

In view of the above problems, it is an object of the present invention is to provide a laser oscillator which is capable of simply constituting an external optical system.

In order to solve the above problems, according to the present invention, there is provided a laser oscillator in which a laser beam is emitted from a folded-type resonator multitudinously folding back an optical axis, including a folding section having first and second reflecting mirrors which are inclined at an angle of 45° to the horizontal plane with respect to each optical axis of excitation sections and further inclined at an angle of 45° to the vertical plane, and a third reflecting mirror which is horizontally arranged, and whose center coincides with the vertex of an isosceles right triangle of which base is formed by a line connecting the center of the aforesaid first reflecting mirror with that of the aforesaid second reflecting mirror.

In the folding section, a light component having a reflecting angle of 90° is reflected toward the third reflecting mirror by the first and second reflecting mirrors; for this reason, an S polarized-light component is reflected. The first and second reflecting mirrors are inclined at an angle of 45° to the vertical plane, so that the S polarized-light component is inclined at an angle of 45° to the horizontal plane. In other words, a linearly polarized laser beam inclined at an angle of 45° to the horizontal plane is outputted from the folded-type resonator.

Therefore, an external optical system for transforming a laser beam into a circularly polarized laser beam can be obtained by only a ¼ wave-length mirror, for example. Thus, the external optical system can simply be constituted.

BEST MODE FOR CARRYING OUT THE INVENTION

One embodiment of the present invention will be described below with reference to the drawings.

Figure 1:
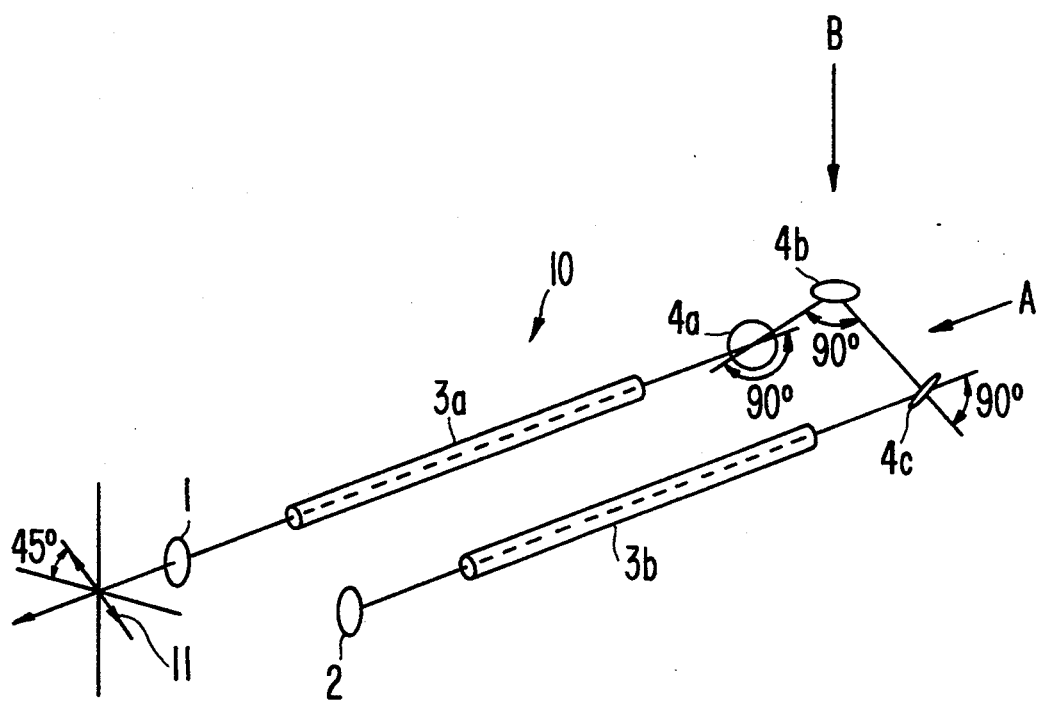
FIG. 1 is a view showing a configuration of a folded-type resonator according to the present invention.

FIG. 1 is a view showing a configuration of a folded-type resonator according to the present invention. In the figure, a folded-type resonator 10 comprises an output mirror 1, a rear mirror 2, excitation sections 3a and 3b, and reflecting mirrors 4a, 4b and 4c. The reflecting mirror 4b is horizontally placed, and arranged so that the center of the mirror 4b coincides with the vertex of an isosceles right triangle in which a line connecting the center of the reflecting mirror 4a with that of the reflecting mirror 4c forms a base thereof.

Figure 2:
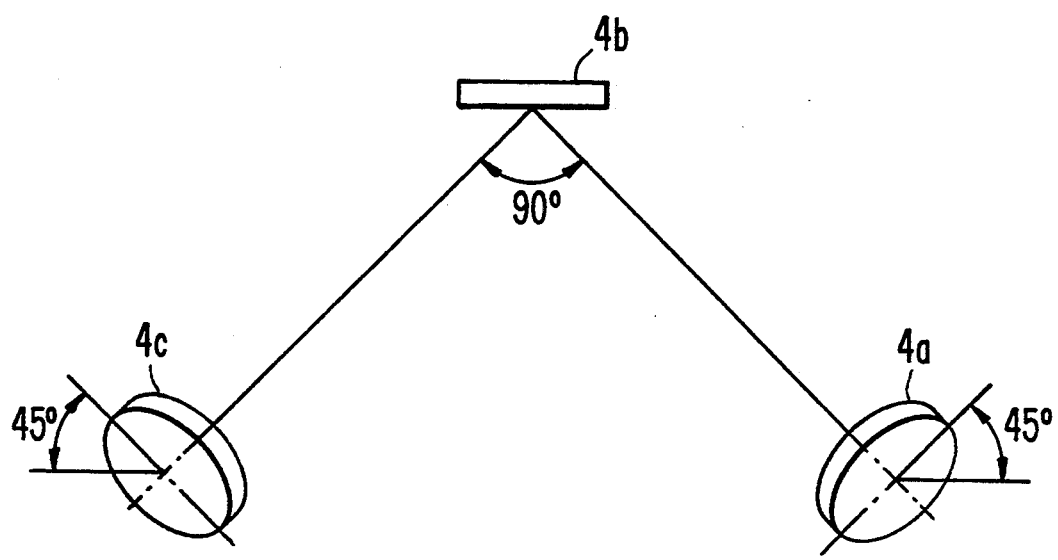
FIG. 2 is a view showing reflecting mirrors viewed from the direction shown by an arrow A of FIG. 1.

FIG. 2 is a view showing reflecting mirrors 4a, 4b and 4c viewed from the direction shown by an arrow A in FIG. 1. The reflecting mirrors 4a and 4c inclined at an angle of 45° to the vertical plane.

Figure 3:
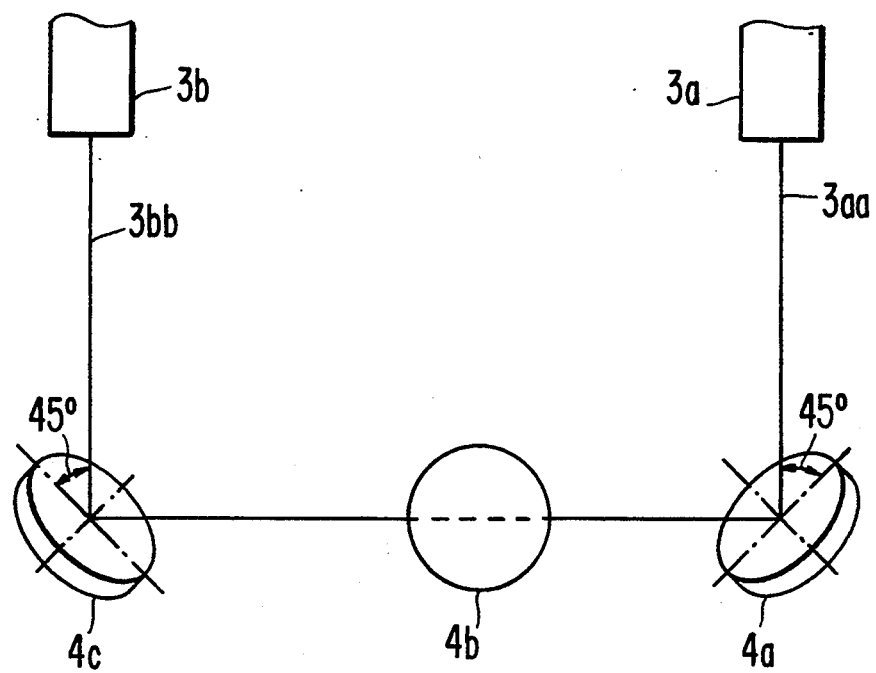
FIG. 3 is a view showing reflecting mirrors viewed from the direction shown by an arrow B of FIG. 1.

FIG. 3 is a view showing reflecting mirrors 4a, 4b and 4c viewed from the direction shown by an arrow B in FIG. 1. As shown in the figure, the reflecting mirror 4a is inclined at an angle of 45° to the horizontal plane with respect to an optical axis 3aa of the excitation section 3a. Likewise, the reflecting mirror 4c is inclined at an angle of 45° to the horizontal plane with respect to an optical axis 3bb of the excitation section 3b.

Thus, an S polarized-light component of a laser beam excited by the excitation section 3b is reflected toward the reflecting mirror 4b by the reflecting mirror 4c. Then, a P polarized-light component is reflected toward the reflecting mirror 4a by the reflecting mirror 4b. Moreover, a reflecting-light component of the reflecting mirror 4a is an S polarized-light component. In this case, the reflecting mirror 4a is inclined at an angle of 45° to the vertical plane, so that the S polarized-light component, namely a linearly polarized laser beam which is inclined at an angle of 45° to the horizontal plane can be provided.

Figure 4:
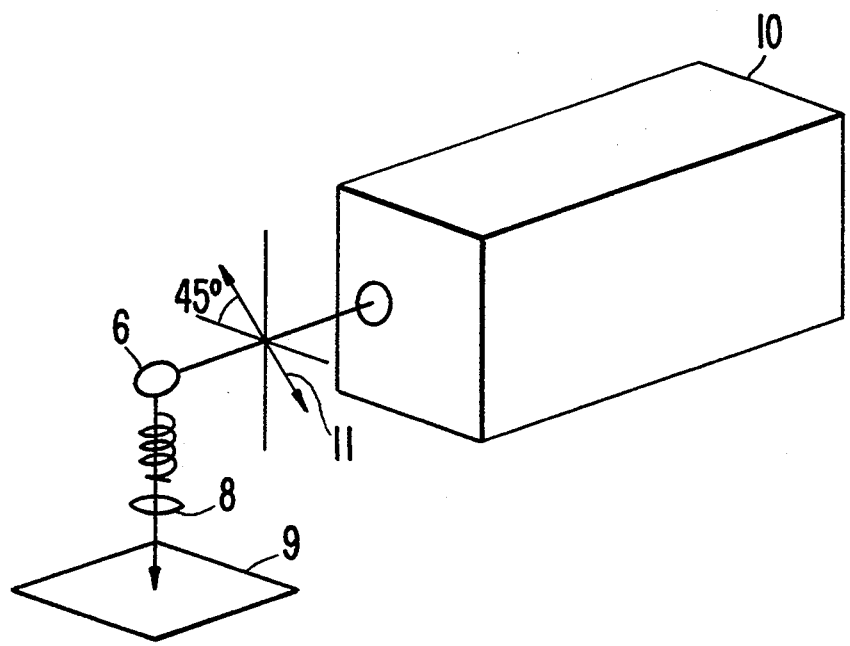
FIG. 4 is a view showing an external optical system for transforming a linearly polarized laser beam into a circularly polarized laser beam.
Figure 5:
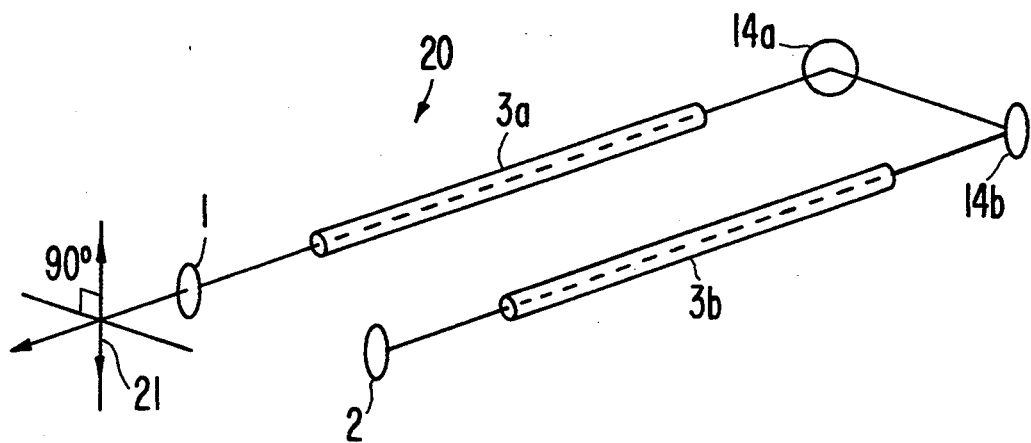
FIG. 5 is a view schematically showing a configuration of a conventional folded-type resonator.
Figure 6:
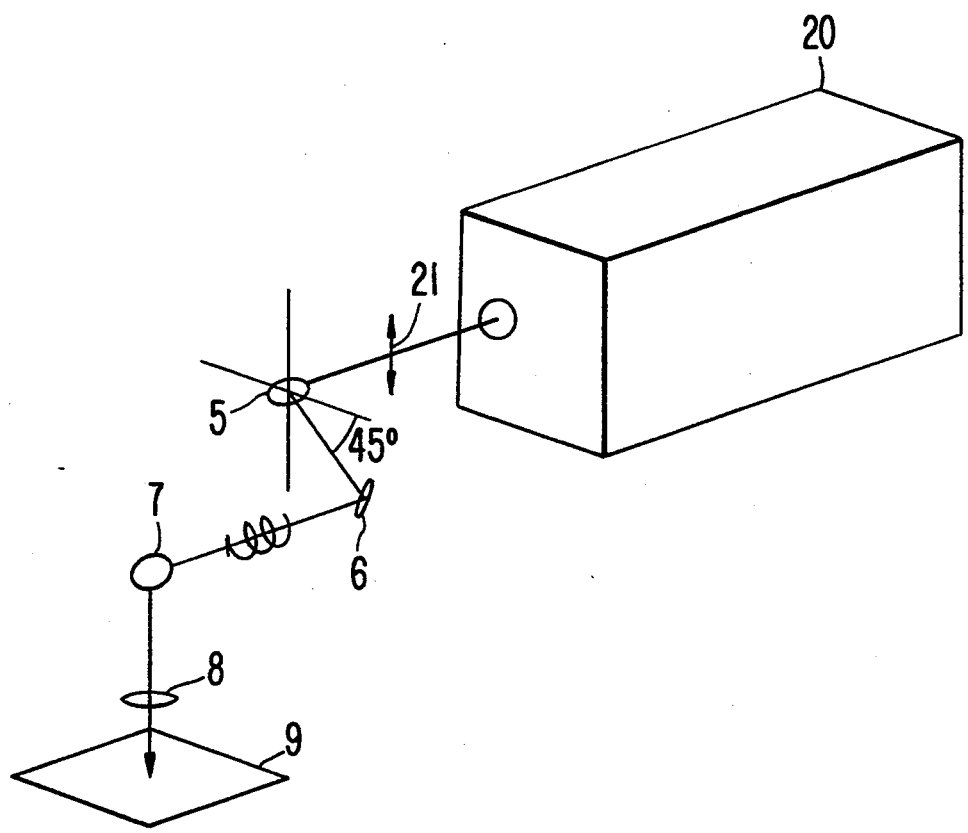
FIG. 6 is a view showing a conventional optical system for transforming a linearly polarized laser beam into a circularly polarized laser beam.

FIG. 4 is a view showing an external optical system for transforming a linearly polarized laser beam into a circularly polarized laser beam. A laser beam emitted from the aforesaid folded-type resonator 10 is polarized linearly in the direction shown by an arrow 11, namely at an angle of 45°. The laser beam is transformed into a circularly polarized laser beam by the $\frac{1}{4}$ wavelength mirror 6 while being directed in the vertically downward direction, and is converged by the condenser lens 8, thus being irradiated to the workpiece 9.

The conventional external optical system for transforming a laser beam into a circularly polarized laser beam requires three mirrors, that is, a mirror for polarizing a laser beam at an angle of 45°, a $\frac{1}{4}$ wave-length mirror, and a mirror for directing a laser beam in the vertically downward direction. On the contrary, in the present embodiment, a laser beam polarized at an angle of 45° is directly emitted, so that only one $\frac{1}{4}$ wave-length mirror 6 need be used. That is, one mirror can be reduced on balance, as one reflecting mirror is added to the folding section.

In particular, the number of mirrors provided on the outside of the resonator 10 is reduced, so that the manpower required for disassembling, cleansing, adjustment in assembling and the like can be reduced considerably.

In the above embodiment, a laser oscillator with two excitation sections is described. Three or more excitation sections may be employed, being provided with plural folding sections having the same structure as described above. However, if three or more excitation sections are provided, the number of reflecting mirrors increases in the folding section; as a consequence, there is no reduction in the number of the mirrors as a whole. However, the external optical system is simply constructed, so that operations such as maintenance and assembling can readily be performed.

As described above, according to the present invention, a folded-type resonator of a laser oscillator is constituted so that a linearly polarized laser beam which is inclined at an angle of 45° to the horizontal plane is generated in the folding section. Thus, a laser beam emitted from the aforesaid folded-type resonator is a linearly polarized laser beam at an angle of 45° to the horizontal plane. Accordingly, as the external optical system for transforming the laser beam outputted from the resonator into a circularly polarized laser beam, only a $\frac{1}{4}$ wavelength mirror is sufficient, for example. Thus, the external optical system is simply constructed.

Particularly, the number of mirrors provided on the outside of the resonator is reduced, so that maintenance operations such as disassembling and cleansing can readily be performed, and the external optical system can further simply be assembled.

We claim:

1. A laser oscillator including a folded-type resonator for emitting a linearly polarized laser beam such that an optical axis of the laser beam is folded multitudinously, comprising:

a laser oscillator including a folding section having first and second reflecting mirrors inclined at an angle of 45° to a horizontal plane with respect to each optical axis of each excitation section, and said first and second reflecting mirrors are further inclined at an angle of 45° to a vertical plane, a third reflecting mirror horizontally arranged such that it has a center thereof located at a vertex of an isosceles right triangle whose base is defined by a line connecting centers of the first and second reflecting mirrors, said folded resonator thereby producing a linearly polarized output beam.

2. The laser oscillator according to claim 1, wherein said resonator comprises a plurality of folding sections.

* * * * *